Figure 1:
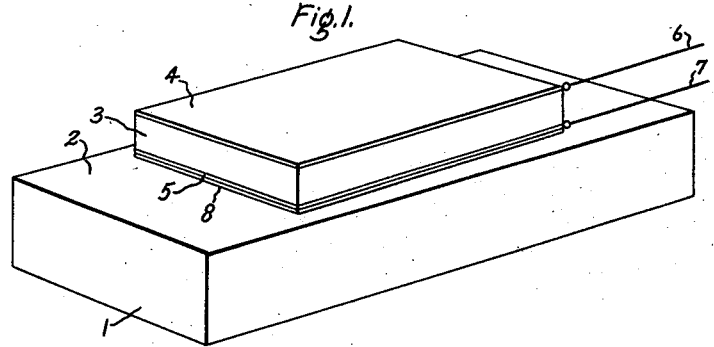

June 26, 1951     W. H. JANSSEN     2,558,563

PIEZOELECTRIC STRAIN GAUGE

Filed Oct. 29, 1948

Inventor:
William H. Janssen,
by Richard E. Hosley
His Attorney.

Patented June 26, 1951

2,558,563

UNITED STATES PATENT OFFICE 2,558,563

PIEZOELECTRIC STRAIN GAUGE

William H. Janssen, Schenectady, N. Y., assignor to General Electric Company, a corporation of New York Application October 29, 1948, Serial No. 57,345

1 Claim. (Cl. 171—327)

This invention relates to an improved piezoelectric crystal strain gauge.

An object of the invention is to provide an improved strain gauge responsive to alternating strains over an extremely wide band of frequencies.

Another object of the invention is to provide a strain gauge having a much greater sensitivity than gauges now in common use.

Another object is to provide a strain-sensitive element which produces little mechanical loading of the member subject to strain, and hence has a reduced effect upon the natural resonant frequencies of such member.

Another object is to provide an improved piezoelectric strain gauge which is more rugged and less liable to damage than crystal gauges heretofore used.

Another object is to provide an improved crystal strain gauge having a low electrical impedance, to facilitate coupling through cables with maximum energy transfer and minimum loss.

Another object is to provide an improved crystal strain gauge, the operation and use of which will not be substantially affected or limited by resonant frequencies of the crystal.

Other objects and advantages will become apparent as the description proceeds.

The features of the invention which are believed to be novel and patentable are pointed out in the claim forming a part of this specification. For a better understanding of the invention, reference is made in the following description to the accompanying drawing in which Figs. 1, 2, and 3 respectively illustrate three embodiments of the invention.

In strain gauges constructed according to this invention, the strain sensitive element is a thin piezoelectric crystal having two parallel faces which are large relative to the thickness of the crystal. At least one of these large faces is rigidly attached to the member subject to strain, with an orientation such that the large faces are parallel to the direction of strain. When strain is applied, the rigid attachment of the crystal to the strained member causes the crystal to be mechanically deformed responsive to the strain in a direction parallel to its large faces. As a result of such deformation, a voltage is produced between the two large faces of the crystal. Electrodes may be provided in contact with the large faces and electrically connected to voltage responsive apparatus, such as a voltage amplifier and an indicating or recording instrument. An ADP crystal ten mils thick and one-half inch square has been found to be very satisfactory for use in this manner. However, the crystal may be larger, or much smaller.

This type of strain-sensitive element has many advantages over crystal elements commonly used, in which the crystal is strained or deformed perpendicular to the plane of its large faces, or alternatively is bent or warped, as by a force applied to one of its corners. By deforming the crystal parallel to the plane of its large faces in accordance with this invention, the crystal is much less subject to breakage, especially in view of the fact that the crystal may be very thin and has at least one of its large faces rigidly attached to the member subject to strain, which may be a steel bar for example. A crack in the crystal does not necessarily destroy the gauge as in previous types, because the firm attachment of the thin crystal to the strained member insures continued operation despite the presence of a crack.

The crystal has a low electrical impedance because its electrodes are closely spaced. Its small size reduces loading of the member subject to strain and therefore produces minimum disturbance of the natural resonant frequencies of such member. Because of its thinness and firm attachment to the strained member, the crystal does not tend to vibrate at its own resonant frequency. Thus, a crystal may be used over an extremely broad frequency range extending from about one-half cycle per second to several million cycles per second.

Sensitivities in the order of 1000 times those realized with wire strain gauges are obtained, which eliminates the need for costly, low-level amplifiers; and furthermore, no D.-C. excitation is required.

Refer now to Fig. 1, which shows one embodiment of the invention. Member 1, which may be a steel bar, is subject to strain in tension or compression along its length. Surface 2 of the bar is parallel to the direction of strain. A thin piezoelectric crystal 3 has two parallel faces which are large relative to the thickness of the crystal, and which are also oriented parallel to the direction of strain. One of these faces is rigidly attached to bar 1 in the manner hereinafter described. Preferably, two electrodes 4 and 5 are in contact with and substantially cover the large faces, as shown. These electrodes may be formed by depositing a thin layer of metal on each of the large faces of the crystal. The metal can be deposited in ways known in the art so that it adheres firmly to the face of the crystal and forms a secure bond therewith. Leads 6 and 7 are connected to the respective electrodes, and at their other end to suitable voltage-responsive apparatus. A layer 8 of strong glue or cement may be used to firmly attach electrode 5, and hence the lower face of crystal 3, rigidly to surface 2 of the strained member.

If member 1 is an electrically conducting material such as a steel bar, it is evident that it may serve as the lower electrode, and that electrode 5 may be eliminated, provided the cement or bonding agent in layer 8 is relatively thin or is an electrically conducting material, or if other means are employed to provide an electrical connection between surface 2 and the lower face of crystal 3. When the cement is a non-conducting material, electrical connection is made by capacitive coupling between the crystal face and the surface of the strained member.

Figure 2:
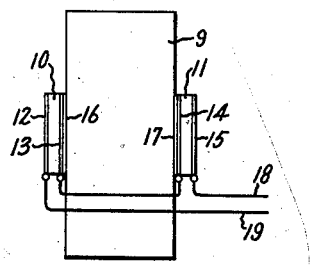

Refer now to Fig. 2, which is an elevation of another embodiment of the invention. Member 9 may be a column which is subject to bending in a plane represented in the drawing by the paper. Such bending will produce strain parallel to the surface on both sides of the column. The side toward which the column is bent will be under compression, and the opposite side will be under tension. Thin piezoelectric crystals 10 and 11 are rigidly attached to these two opposite sides of the column, as shown. Electrodes 12, 13, 14, and 15 are provided in contact with the large faces of the respective crystals. Layers 16 and 17 of suitable bonding material are used to rigidly attach the crystals to member 9.

Since one side of member 9 is in compression, while the other side is in tension, the voltages across the two crystals will have opposite polarities. Therefore, to obtain an indication of the amount of bending, the electrodes are connected in series with reversed polarity as shown, so that the two voltages produced add together to provide a voltage of double value across output connections 18 and 19. If member 9 is subject to simple tension or compression without bending, the voltages produced across the two crystals will have the same polarity, and will tend to balance out so that no substantial voltage appears across connections 18 and 19. The arrangement shown is thus one which provides an indication of the amount of bending to which member 9 is subject, without indicating simple tension and compression which may occur without bending.

If it is desired to determine the strain in simple tension and compression of member 9, while balancing out strain due to bending, the electrodes are connected together so that the voltages produced across the two crystals are added together in series without reversal of polarity. This may be accomplished by reversing the connections to the electrodes of one of the crystals from the arrangement shown in Fig. 2.

Figure 3:
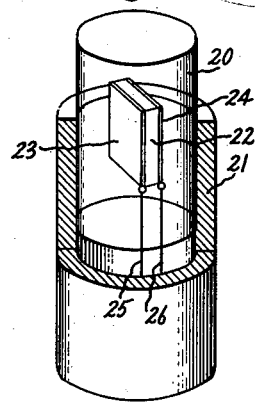

Refer now to Fig. 3, which shows the invention embodied in a sound probe. The member subject to strain is a small cylinder 20. For purposes of illustration in the drawing, this cylinder is shown as being a transparent plastic material. In actual practice, this material may or may not be transparent. The cylinder may be supported at the end of a small metal pipe 21, as shown, to form a sound probe. When the probe is moved into a sound field, sound waves impinge upon the exposed end of cylinder 20 and produce in the cylinder longitudinal strains in tension and compression alternately.

Embedded in the cylinder is a thin piezoelectric crystal 22, having opposite faces which are large relative to the thickness of the crystal and are oriented parallel to the direction of strain. Electrodes 23 and 24 are in contact with these two opposite faces. Connections 25 and 26 are respectively attached to the two electrodes, and extend back through pipe 21 to suitable voltage responsive apparatus. Since crystal 22 is embedded within cylinder 21, its large faces are thereby firmly attached to the member subject to strain.

It is evident that many other applications are possible which utilize the principle of this invention. For example, a phonograph pickup could be made in which the phonograph needle subjects a member to strain, and such member is provided with a strain gauge of the type which has been described. Another application is in the construction of a microphone, where strain is produced by movement of the microphone diaphragm.

Having described the principle of this invention and the best mode in which I have contemplated applying that principle, I wish it to be understood that the apparatus described is illustrative only, and that other means can be employed without departing from the true scope of the invention defined by the following claim.

What I claim as new and desire to secure by Letters Patent of the United States is:

A sound probe comprising a metal pipe having an open end, a cylinder of plastic material positioned coaxially within the open end of said pipe, one end of said cylinder being exposed to permit sound waves to impinge thereon, thereby subjecting said cylinder to longitudinal strain in tension and compression alternately, a thin piezoelectric crystal having two opposite faces which are large relative to the thickness of the crystal, said crystal having a thickness in the order of ten mils, thin electrodes rigidly attached to the large faces of said crystal, said crystal being embedded within said cylinder with the large faces of the crystal parallel to the axis of the cylinder, the large faces of the crystal being firmly attached to the cylinder through the thin electrodes whereby longitudinal strains in the cylinder are transmitted to the crystal through its large faces, and electrical connections to said electrodes.

WILLIAM H. JANSSEN.

REFERENCES CITED

The following references are of record in the file of this patent:

UNITED STATES PATENTS

| Number | Name | Date |
|---|---|---|
| 1,495,429 | Nicolson | May 27, 1924 |
| 1,693,806 | Cady | Dec. 4, 1928 |
| 1,912,213 | Nicolson | May 30, 1933 |
| 2,480,535 | Alois | Aug. 30, 1949 |